United States Patent
Hoyles et al.

(10) Patent No.: US 11,111,431 B2
(45) Date of Patent: Sep. 7, 2021

(54) METHOD FOR REDUCING THE PERMEABILITY OF A SUBTERRANEAN FORMATION TO AQUEOUS-BASED FLUIDS

(71) Applicant: Dow Global Technologies LLC, Midland, MI (US)

(72) Inventors: Stephen M. Hoyles, Lake Jackson, TX (US); Sayeed Abbas, Houston, TX (US); Robert E. Hefner, Jr., Rosharon, TX (US); Shawn J. Maynard, Angleton, TX (US); Cesar E. Meza, Pearland, TX (US)

(73) Assignee: Dow Global Technologies LLC, Midland, MI (US)

(*) Notice: Subject to any disclaimer, the term of this patent is extended or adjusted under 35 U.S.C. 154(b) by 359 days.

(21) Appl. No.: 16/310,219

(22) PCT Filed: Jun. 23, 2017

(86) PCT No.: PCT/US2017/039070
§ 371 (c)(1),
(2) Date: Dec. 14, 2018

(87) PCT Pub. No.: WO2017/223490
PCT Pub. Date: Dec. 28, 2017

(65) Prior Publication Data
US 2019/0330522 A1    Oct. 31, 2019

Related U.S. Application Data

(60) Provisional application No. 62/354,151, filed on Jun. 24, 2016.

(51) Int. Cl.
*C09K 8/88* (2006.01)
*C08G 59/24* (2006.01)
*C08K 3/16* (2006.01)
*C08K 5/098* (2006.01)
*C08L 63/00* (2006.01)
(Continued)

(52) U.S. Cl.
CPC ............ *C09K 8/885* (2013.01); *C08G 59/245* (2013.01); *C08K 3/16* (2013.01); *C08K 5/098* (2013.01); *C08K 5/17* (2013.01); *C08K 5/42* (2013.01); *C08L 63/00* (2013.01); *C09K 8/588* (2013.01)

(58) Field of Classification Search
None
See application file for complete search history.

(56) References Cited

U.S. PATENT DOCUMENTS 3,306,872 A   2/1967   Maycock et al.
3,341,580 A   9/1967   Hechenbleikner
(Continued)

OTHER PUBLICATIONS

Odian, G., "Principles of Polymerization," 4th ed.
"Hofmeister series," Wikipedia, 2018.

*Primary Examiner* — John J Figueroa

(57) ABSTRACT

Disclosed is a composition and use thereof for the recovery of hydrocarbon fluids from a subterranean reservoir. More particularly, this invention concerns sulfonated epoxy resin polymers comprising an epoxide-containing compound, a primary amino sulfonate, and optionally one or more of a primary monoamine alkylene oxide oligomer, that modify the permeability of subterranean formations and increase the mobilization and/or recovery rate of hydrocarbon fluids present in the formations.

8 Claims, 1 Drawing Sheet

(51) Int. Cl.
*C09K 8/588* (2006.01)
*C08K 5/17* (2006.01)
*C08K 5/42* (2006.01)

(56) References Cited

U.S. PATENT DOCUMENTS

| | | | |
|---|---|---|---|
| 3,379,684 A | | 4/1968 | Wiesner et al. |
| 3,477,990 A | | 11/1969 | Dante et al. |
| 3,547,881 A | | 12/1970 | Mueller et al. |
| 3,637,590 A | | 1/1972 | Maycock et al. |
| 3,843,605 A | | 10/1974 | Schmidt et al. |
| 3,865,803 A | * | 2/1975 | Falkehag ............... C09K 8/035 527/400 |
| 3,948,855 A | | 4/1976 | Perry |
| 3,956,237 A | | 5/1976 | Doorakian et al. |
| 4,048,141 A | | 9/1977 | Doorakian et al. |
| 4,093,650 A | | 6/1978 | Doorakian et al. |
| 4,131,633 A | | 12/1978 | Doorakian et al. |
| 4,132,706 A | | 1/1979 | Doorakian et al. |
| 4,171,420 A | | 10/1979 | Doorakian et al. |
| 4,177,216 A | | 12/1979 | Doorakian et al. |
| 4,317,757 A | | 3/1982 | Kooijmans et al. |
| 4,366,295 A | | 12/1982 | Tyler, Jr. et al. |
| 4,379,872 A | | 4/1983 | Ishikura et al. |
| 6,569,983 B1 | | 5/2003 | Treybig et al. |
| 7,417,011 B2 | | 8/2008 | Treybig et al. |
| 7,678,872 B2 | | 3/2010 | Glass et al. |
| 7,893,136 B2 | | 2/2011 | Glass et al. |
| 9,688,905 B2 | * | 6/2017 | Nguyen ................. C09K 8/64 |
| 10,876,032 B2 | * | 12/2020 | Hoyles ............... C08G 59/1483 |
| 2005/0059794 A1 | | 3/2005 | Glass et al. |
| 2005/0065036 A1 | | 3/2005 | Treybig et al. |
| 2016/0177162 A1 | * | 6/2016 | Nguyen ................. C09K 8/602 166/300 |

* cited by examiner

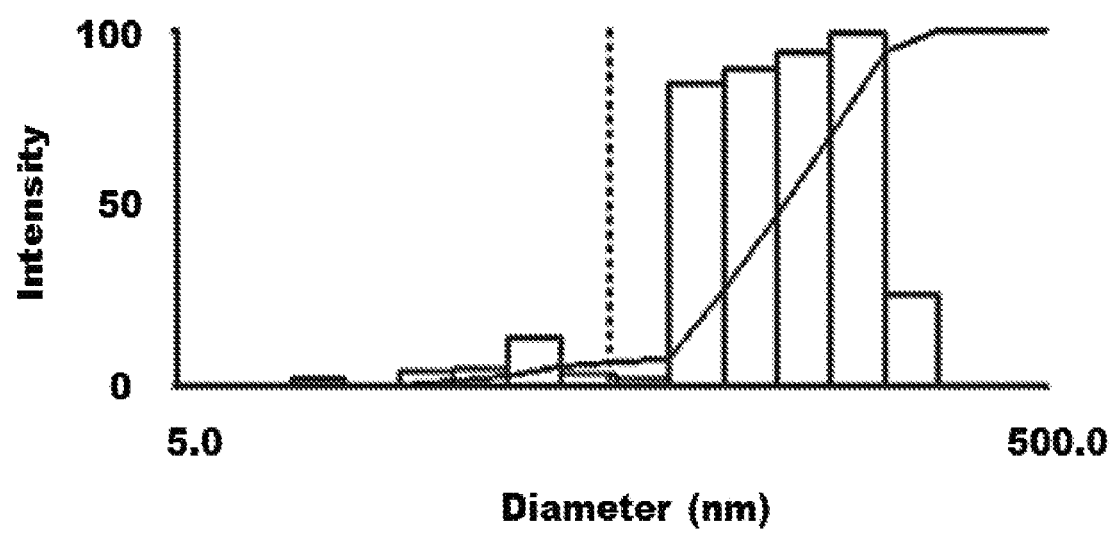

METHOD FOR REDUCING THE PERMEABILITY OF A SUBTERRANEAN FORMATION TO AQUEOUS-BASED FLUIDS

FIELD OF THE INVENTION

This invention provides compounds, compositions and methods for the recovery of hydrocarbon fluids from a subterranean reservoir. More particularly, this invention concerns sulfonated epoxy resin polymers that modify the permeability of subterranean formations to aqueous-based fluids and increase the mobilization and/or recovery rate of hydrocarbon fluids present in the formations.

BACKGROUND OF THE INVENTION

The production of large amounts of water from oil and gas wells constitutes one of the major expenses in the overall recovery of hydrocarbons from a subterranean formation. Many producing oil wells produce a gross effluent having greater than 80% by volume water. Therefore, most of the pumping energy is expended by lifting water from the well. Then the production effluent must be subjected to expensive separation procedures in order to recover water-free hydrocarbons. The water constitutes a troublesome and an expensive disposal problem.

Therefore, it is highly desirable to decrease the amount of water produced from oil and gas wells. Another beneficial effect of decreasing the amount of produced water is realized by decreasing the flow of water in the well bore at a given pumping rate thereby lowering the liquid level over the pump in the well bore, thereby reducing the back pressure in the formation and improving pumping efficiency and net daily oil production.

SUMMARY OF THE INVENTION

The present invention is a method of modifying the permeability to water of a subterranean formation comprising the step of injecting into the subterranean formation an aqueous composition comprising from about 0.005 percent to about 2 percent, by weight, of a composition comprising the reaction products of: (i) epoxide-containing compound having an average of more than one epoxide group per molecule, (ii) a primary amino sulfonate, (iii) optionally a primary monoamine alkylene oxide oligomer, and (iv) optionally a primary monoamine, a secondary diamine, a monohydroxyalkyl primary monoamine, a dihydroxyalkyl primary monoamine, a trihydroxyalkyl primary monoamine, a mono hydroxycycloalkyl primary monoamine, a dihydroxycycloalkyl primary monoamine, or a trihydroxycycloalkyl primary monoamine.

In one embodiment of the method of the present invention described herein above, the epoxide-containing compound (i) is represented by the formula:

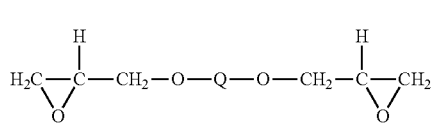

where Q is selected from a divalent aromatic group —Ar—; Ar-L-Ar, wherein L is selected from a direct bond, $C_1$ to $C_8$ alkylene, —$SO_2$—, —S—, >C=O, or —O—; a divalent cycloaliphatic group K having from 4 carbons to 8 carbons, or —$R_1$—K—$R_2$— where $R_1$ and $R_2$ are independently a $C_1$ to $C_3$ alkylene group, preferably the epoxide-containing compound is selected from a diglycidyl ether of 4,4'-isopropylidenediphenol (bisphenol A); cis-1,3-cyclohexanedimethanol; trans-1,3-cyclohexanedimethanol; cis-1,4-cyclohexanedimethanol; or trans-1,4-cyclohexanedimethanol; the primary amino sulfonate (ii) is represented by the formula:

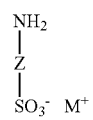

wherein Z is an aliphatic, cycloaliphatic, polycycloaliphatic, or aromatic hydrocarbon group optionally substituted with one or more alkyl groups and M is any monovalent cation, preferably the primary amino sulfonate is selected from sulfanilic acid, sodium salt; sulfanilic acid, potassium salt; aminomethanesulfonic acid, sodium salt; or aminomethanesulfonic acid, potassium salt; and if present, the primary monoamine alkylene oxide oligomer (iii) is represented by the formula:

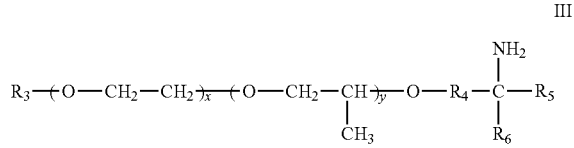

wherein $R_3$ is —H, $C_1$ to $C_{12}$ alkyl or cycloalkyl, $R_4$ is a covalent bond, $C_1$ to $C_{12}$ alkyl or cycloalkyl, $R_5$ and $R_6$ are independently —H, $C_1$ to $C_{12}$ alkyl or cycloalkyl, and x and y independently have a value from 0 to 400, preferably the primary monoamine alkylene oxide oligomer $R_3$ and $R_5$ are —$CH_3$, $R_4$ is —$CH_2$—, $R_6$ is —H, and x and y independently have a value from 0 to 75 with the proviso that at least one of x or y is equal to or greater than 1.

In one embodiment of the method of the present invention described herein above, the molar ratio of (i) the epoxide-containing compound to (ii) the primary amino sulfonate is 5:1 to 1:5.

In one embodiment of the method of the present invention described herein above, the reaction products of claim 1 have an average molecular weight of from 300 to 100,000.

In one embodiment of the method of the present invention described herein above the aqueous composition further comprises about 1 to about 10 weight percent of one or more clay stabilization salts, preferably KCl, NaCl, NaBr, sodium acetate and $NH_4Cl$.

BRIEF DESCRIPTION OF THE DRAWINGS

FIG. 1 is a plot of the size distribution profile of Example 2 in solution as determined by dynamic light scattering.

DETAILED DESCRIPTION OF THE INVENTION

One embodiment of the present invention is a sulfonated epoxy resin oligomer or polymer (hereinafter "polymer") and method to make said sulfonated epoxy resin polymer wherein the sulfonated epoxy resin polymer comprises, consist essentially of, consists of the reaction product of reacting an epoxy resin (i) with at least one primary amino sulfonate (ii), and optionally a primary monoamine alkylene oxide oligomer (iii), and/or an additional reactive compound (iv), and/or a monofunctional reactant (v), and/or a catalyst, and/or a solvent.

Component (i) of the sulfonated epoxy resin polymer of the present invention is an epoxy resin and can be an epoxide-containing compound having an average of more than one epoxide group per molecule. The epoxide group can be attached to an oxygen, a sulfur or a nitrogen atom or the single bonded oxygen atom attached to the carbon atom of a —CO—O— group. The oxygen, sulfur, nitrogen atom, or the carbon atom of the —CO—O— group may be attached to an aliphatic, cycloaliphatic, polycycloaliphatic or aromatic hydrocarbon group. The aliphatic, cycloaliphatic, polycycloaliphatic or aromatic hydrocarbon group can be substituted with one or more inert substituents including, but not limited to, alkyl groups, preferably methyl; alkoxy groups, preferably methoxy; halogen atoms, preferably fluorine, bromine or chlorine; nitro groups; or nitrile groups.

Preferred epoxide-containing compounds include the diglycidyl ethers represented by formula I:

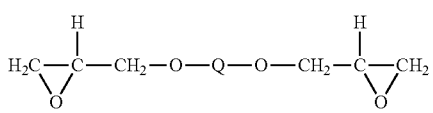

where Q is selected from a divalent aromatic group —Ar—, Ar-L-Ar where L is selected from a direct bond, $C_1$ to $C_8$ alkylene, —$SO_2$—, —S—, >C=O, or —O—, a divalent cycloaliphatic group K having from 4 carbons to 8 carbons, or —$R_1$—K—$R_2$— where $R_1$ and $R_2$ are independently a $C_1$ to $C_3$ alkylene group.

More specific examples of the epoxide-containing compound which can be used include diglycidyl ethers of 1,2-dihydroxybenzene (catechol); 1,3-dihydroxybenzene (resorcinol); 1,4-dihydroxybenzene (hydroquinone); 4,4'-isopropylidenediphenol (bisphenol A); 4,4'-dihydroxydiphenylmethane; 3,3',5,5'-tetrabromobisphenol A; 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,4-dihydroxynaphthalene; 2,6-dihydroxynaphthalene; 9,9-bis(4-hydroxyphenyl)fluorene; 2,2-bis(4-hydroxyphenyl)acetamide; 2,2-bis(4-hydroxyphenyl)-N-methylacetamide; 1,1'-bis(4-hydroxyphenyl)-1-phenylethane; 3,3'-5,5'-tetrachlorobisphenol A; 3,3'-dimethoxybisphenol A; 4,4'-dihydroxybiphenyl; 4,4'-dihydroxy-alpha-methylstilbene; 4,4'-dihydroxybenzanilide; 4,4'-dihydroxystilbene; 4,4'-dihydroxy-alpha-cyanostilbene; N,N'-bis(4-hydroxyphenyl)terephthalamide; 4,4'-dihydroxyazobenzene; 4,4'-dihydroxy-2,2'-dimethylazoxybenzene; 4,4'-dihydroxydiphenylacetylene; 4,4'-dihydroxychalcone; 4-hydroxyphenyl-4-hydroxybenzoate; dipropylene glycol; poly(propylene glycol); thiodiglycol; cis-, trans-1,3- and 1,4-cyclohexanedimethanol; cis-, trans-1,2-cyclohexanedimethanol; cis-, trans-1,3-cyclohexanedimethanol; cis-, trans-1,4-cyclohexanedimethanol; 1,1-cyclohexanedimethanol; 1,1-cyclohexanediethanol; 1,4-bis(2-hydroxyethoxy)cyclohexane; 1,4-cyclohexanediethanol; 1,4-(2-hydroxyethyloxy)cyclohexane; dicyclopentadienedimethanols; norbornenedimethanols; norbornanedimethanols; cyclooctanedimethanols; cis- and trans-2,2,4,4-tetramethylcyclobutane-1,3-diol; the triglycidyl ether of tris(hydroxyphenyl)methane; the polyglycidyl ethers of a phenol or alkyl or halogen substituted phenol-aldehyde acid catalyzed condensation product (novolac resins); the tetraglycidyl amines of 4,4'-diaminodiphenylmethane; 4,4'-diaminostilbene; N,N'-dimethyl-4,4'-diaminostilbene; 4,4'-diaminobenzanilide; 4,4'-diaminobiphenyl; the polyglycidyl ether of the condensation product of a dicyclopentadiene or an oligomer thereof and a phenol or alkyl or halogen substituted phenol; and combinations thereof.

Preferred epoxide-containing compounds are the diglycidyl ether of 4,4'-isopropylidenediphenol (bisphenol A); cis-1,3-cyclohexanedimethanol; trans-1,3-cyclohexanedimethanol; cis-1,4-cyclohexanedimethanol; and trans-1,4-cyclohexanedimethanol.

The epoxide-containing compound which can be used may also include an advanced epoxy resin. The advanced epoxy resin may be a product of an advancement reaction of an epoxy resin with an aromatic di- and polyhydroxy, or carboxylic acid-containing compound. The epoxy resin used in the advancement reaction may include one or more of the aforesaid epoxy resins and/or the aromatic di-hydroxy and polyhydroxy compound may include one or more of the aforesaid precursors to the aforesaid epoxy resins.

Component (ii) of the sulfonated epoxy resin polymer of the present invention is a primary amino sulfonate represented by formula II:

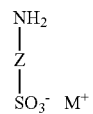

wherein Z is an aliphatic, cycloaliphatic, polycycloaliphatic or aromatic hydrocarbon group and can be substituted with one or more inert substituents including, but not limited to, alkyl groups, preferably methyl; cycloalkyl groups, preferably cyclohexyl, and alkoxy groups, preferably methoxy, and M is any monovalent cation, particularly $Li^+$, $Na^+$, $K^+$, and $NH_4^+$.

Preferred primary amino sulfonate compounds are sulfanilic acid, sodium salt; sulfanilic acid, potassium salt; aminomethanesulfonic acid, sodium salt; and aminomethanesulfonic acid, potassium salt.

Preferably, the molar ratio of (i) the epoxide-containing compound to (ii) the primary amino sulfonate is 5:1 to 1:5.

Optional component (iii) of the sulfonated epoxy resin polymer of the present invention is a primary monoamine alkylene oxide oligomer represented by the formula III:

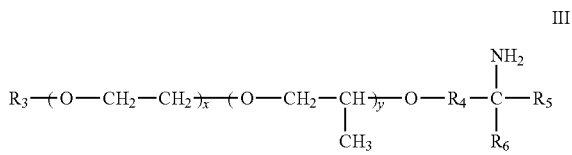

wherein $R_3$ is —H, $C_1$ to $C_{12}$ alkyl or cycloalkyl,
$R_4$ is a covalent bond, $C_1$ to $C_{12}$ alkyl or cycloalkyl,
$R_5$ and $R_6$ are independently —H, $C_1$ to $C_{12}$ alkyl or cycloalkyl,
and
x and y independently have a value from 0 to 400.

Preferably, the length of the polyalkylene oxide chain(s) are independently from 0 alkylene oxide unit to 400 alkylene oxide units, preferably from 1 alkylene oxide units to 250 alkylene oxide units, more preferably from 2 alkylene oxide units to 200 alkylene oxide units and, most preferably, from 3 alkylene oxide units to 100 alkylene oxide units.

The alkylene oxide oligomers represented by formula III may be block or random copolymers.

Preferred primary monoamine alkylene oxide oligomers are those of formula III where $R_3$ and $R_5$ are —$CH_3$, $R_4$ is —$CH_2$—, $R_6$ is —H, and x and y independently have a value from 0 to 75 with the proviso that at least one of x or y is equal to or greater than 1. Preferably, the molar ratio of the epoxide-containing compound (i) to the a primary monoamine alkylene oxide oligomer (iii) is 5:1 to 1:5. More preferably, the primary monoamine alkylene oxide oligomer is used in an amount to provide from 0.01 to 50 percent, more preferably from 0.1 to 20 percent, and most preferably, from 1 to 15 percent, of the the amine hydrogen equivalents for reaction with the epoxide equivalents of component (i), the epoxide-containing compound.

Optional component (iv) of the sulfonated epoxy resin polymer of the present invention is one or more additional reactive compound selected from a primary monoamine, a secondary diamine, a monohydroxyalkyl primary monoamine, a dihydroxyalkyl primary monoamine, a trihydroxyalkyl primary monoamine, a mono hydroxycycloalkyl primary monoamine, a dihydroxycycloalkyl primary monoamine, or a trihydroxycycloalkyl primary monoamine.

Representative additional reactive compounds include N-alkyl primary amines, such as N-butylamine; N-cycloalkylamines, such as aminocyclohexane; and secondary amines, such as N,N'-dimethylethylenediamine. Representatives of the various aforementioned hydroxyalkyl and hydroxycycloalkyl primary monoamines include monoethanolamine, bis(hydroxymethyl)aminomethane, tris(hydroxymethyl)aminomethane, and aminocyclohexanol.

A preferred process to make the sulfonated epoxy resin polymer of the present invention comprises reacting from less than a stoichiometric equivalent to greater than a stoichiometric equivalent of the epoxy resin (i) comprising the epoxide-containing compound, with at least one primary amino sulfonate compound (ii). One or more optional components selected from a primary monoamine alkylene oxide oligomer (iii), a reactive compound (iv), a catalyst, and/or a solvent may also be added. The epoxy resin (i), the at least one primary amino sulfonate compound (ii), and any additional components can be added in any order, including pre-reaction of two or more components followed by addition of one or more additional components and reaction with the aforesaid pre-reaction product. The components may be added all at once or in increments. One or more components may be pre-dissolved in a suitable solvent and used as a solution in the advancement reaction. The components are mixed to form a reaction mixture which is held at room temperature or below and/or heated at a temperature and time sufficient to achieve the desired degree of advancement reaction, preferably producing an advanced epoxide resin mixture having an average molecular weight between 300 to 100,000. The method to prepare the sulfonated epoxy resin polymer can be a batch or continuous process. One or more solvents inert to the reactants and the sulfonated epoxy resin polymer product may beneficially be employed in the advancement reaction.

The stoichiometric ratio of the epoxide groups in the epoxide-containing compound to the amine hydrogen groups in the primary amino sulfonate compound can be 5:1 to 1:5, specifically 1:1.5 to 1.5:1, and more specifically 1:1.1 to 1.1:1. As described in polymer textbooks, such as George Odian in *Principles of Polymerization,* 4th edition, a near stoichiometric ratio, e.g. an equivalent ratio of amine hydrogen groups in the primary amino sulfonate compound and epoxide groups in the epoxide-containing compound of 1.1:1 to 1:1.1 can be used to prepare substantially linear high molecular weight sulfonated epoxy resin polymer. A significant deviation from the stoichiometric ratio can result in oligomers or low molecular weight sulfonated epoxy resin product.

The temperature of the advancement reaction can be 0° C. to 150° C., preferably 20° C. to 100° C., and more preferably 25° C. to 50° C. The pressure of the advancement reaction can be 0.1 bar to 10 bar, specifically 0.5 bar to 5 bar, and more specifically 0.9 bar to 1.1 bar. The time required to complete the advancement reaction depends upon the temperature employed. Higher temperatures require shorter periods of time whereas lower temperatures require longer periods of time. Generally, however, times of from 5 minutes to about 48 hours, preferably from 30 minutes to about 36 hours, more preferably from 60 minutes to about 24 hours are suitable.

At least one catalyst can optionally be used in the advancement reaction. Catalysts for the advancement reaction can be selected from one or more of a metal salt, an alkali metal salt, an alkaline earth metal salt, a tertiary amine, a quaternary ammonium salt, a sulfonium salt, a quaternary phosphonium salt, a phosphine, and combinations thereof. The catalyst is generally employed in an amount of 0.0010 wt % to 10 wt %, specifically 0.01 wt % to 10 wt %, more specifically 0.05 wt % to 5 wt %, and still more specifically 0.1 wt % to 4 wt %, based on the total weight of the epoxy resin, primary amino sulfonate, and other components, if present.

Particularly suitable catalysts for advancement reaction include, for example, ethyltriphenylphosphonium chloride, ethyltriphenylphosphonium bromide, ethyltriphenylphosphonium iodide, ethyltriphenylphosphonium diacetate (ethyltriphenylphosphonium acetate-acetic acid complex), ethyltriphenylphosphonium phosphate, tetrabutylphosphonium chloride, tetrabutylphosphonium bromide, tetrabutylphosphonium iodide, tetrabutylphosphonium diacetate (tetrabutylphosphonium acetate-acetic acid complex), butyltriphenylphosphonium tetrabromobisphenate, butyltriphenylphosphonium bisphenate, butyltriphenylphosphonium bicarbonate, benzyltrimethylammonium chloride, tetramethylammonium hydroxide, triethylamine, tripropylamine, tributylamine, 2-methylimidazole, benzyldimethylamine, mixtures thereof and the like. Many of these catalysts are described in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216 and 4,366,295, all of which are incorporated herein by reference.

The amount of advancement catalyst, if used, depends upon the particular reactants and catalyst employed; however, it is usually employed in quantities of from about 0.03 to about 3, preferably from about 0.03 to about 1.5, most preferably from about 0.05 to about 1.5 percent by weight based upon the weight of the epoxide-containing compound.

If, desired, the advancement reaction can be conducted in the presence of one or more solvents. Suitable such solvents include, for example, glycol ethers, aliphatic and aromatic hydrocarbons, aliphatic ethers, cyclic ethers, amides, combinations thereof and the like. Particularly suitable solvents include, for example, toluene, benzene, xylene, methyl ethyl ketone, diethylene glycol methyl ether, dipropylene glycol methyl ether, N,N-dimethylformamide, N-methylpyrrolidinone, N,N-dimethylacetamide, tetrahydrofuran, propylene glycol methyl ether, combinations thereof and the like. The solvents can be employed in amounts of from 0% to 300%, preferably from 20% to 150%, more preferably from 50% to 100% by weight based upon the total weight of the reactants. An aprotic solvent, such as N,N-dimethylformamide is most preferred.

In one embodiment of the present invention, the sulfonated epoxy resin polymer can contain unreacted terminal epoxide groups. The sulfonated epoxy resin polymer can also contain unreacted groups from the primary amino sulfonate. Thus, it can be beneficial to react all or a portion of any of these end groups with one or more monofunctional reactants (v). The monofunctional reactant can also serve as a chain termination agent. Thus, the monofunctional reactant can be added during the advancement reaction to terminate the growing oligomer chains and control molecular weight build. Incorporation of monofunctional reactants into the sulfonated epoxy resin polymer modifies its solubility characteristics and/or the physical or mechanical properties as well.

Examples of monofunctional reactants (v) reactive with a terminal epoxide groups include phenol, substituted phenols, naphthols, substituted naphthols, thiols, benzoic acid, substituted benzoic acids, phenylacetic acid, substituted phenylacetic acids, cyclohexane monocarboxylic acid, substituted cyclohexane monocarboxylic acids, naphthalene monocarboxylic acid, aliphatic monocarboxylic acids, such as hexanoic acid; secondary monoamines, such as N-methylcyclohexylamine or dihexylamine; dialkanolamines, such as diethanolamine; and combinations comprising one or more of the foregoing. Terminal amino groups can be reacted with a monoepoxide, such as phenylglycidyl ether, the monoglycidyl ether of cyclohexanol or the monoglycidyl ether of cyclohexanedimethanol.

Preferably, the sulfonated epoxy resin polymer of the present invention has a molecular weight of from 300 to 100,000, more preferably from 500 to 50,000 and, most preferably, from 1,000 to 20,000.

Aqueous solutions of the sulfonated epoxy resin polymer of the invention can exhibit a cloud point or lower critical solution temperature (LCST), such that an aqueous solution of the sulfonated epoxy resin polymer flows at some temperature below the boiling point of water, preferably room temperature, and becomes more viscous and/or gels with the possible optical transition from clear-to-hazy/opaque/turbid at more elevated temperatures. The term cloud point is a term that can be used to describe the optical transition. As used herein, the term "LCST" describes the temperature at which the polymer solution experiences a phase transition going from one phase (homogeneous solution) to at least a two-phase system (a polymer rich phase and a more solvent rich phase) as the solution temperature increases. The cloud point or LCST can be changed by the addition of salts, acids, or bases to the aqueous solutions of the sulfonated epoxy resin polymer. The cloud point or LCST can also be changed as a function of concentration of the sulfonated epoxy resin polymer in aqueous solutions as well as the molecular weight of the the sulfonated epoxy resin polymer.

Another embodiment of the present invention is a method of modifying the permeability to water of a subterranean formation comprising, consisting essentially of, consisting of the step of injecting into the subterranean formation an aqueous composition comprising the sulfonated epoxy resin polymer disclosed herein above.

We have found that the sulfonated epoxy resin polymers of the present invention are effective at reducing the amount of water recovered from subterranean, hydrocarbon-bearing formations, thereby increasing the production rate of hydrocarbons from the formation. The polymers of this invention are particularly effective at decreasing the water permeability with little effect on the oil permeability. The polymers of this invention are also particularly effective for use in gas and oil wells that operate at temperatures higher than about 200° F. where polymers such as polyacrylamide (PAM), hydrolyzed polyacrylamide (HPAM) and ester-containing polymers are less effective due to hydrolysis of the ester or amide functionality.

Water conformance is the application of processes in reservoirs and boreholes to reduce water production and enhance oil recovery. Water conformance can be applied to locations in the well where there is a separate oil producing zone adjacent to a water producing zone, and where the reservoir has a high water saturation along with oil. It can be applied in reservoirs of different matrix. For example, water conformance can be applied to sandstone and limestone (carbonate) matrix. The sulfonated epoxy resin polymers of the present invention can be used in any of these water conformance applications.

One embodiment of the present invention is a method of modifying the permeability to water of a subterranean formation comprising injecting into the subterranean formation an aqueous composition comprising from about 0.005 percent to about 2 percent, by volume, of a sulfonated epoxy resin polymer of the present invention, wherein the sulfonated epoxy resin polymer is prepared as disclosed herein above.

In one embodiment of the present invention, a solution of the sulfonated epoxy resin polymer in water can be prepared by adding one or more water miscible solubilizing agents to an aqueous solution of the sulfonated epoxy resin polymer.

A further embodiment of the present invention includes the amphoteric amino sulfonate polymer formed by reacting one or more (I) sulfonated epoxy resin polymers of the present invention and one or more (II) acidic acting substances.

An aqueous sulfonated epoxy resin polymer/solubilizing agent solution can also be prepared by synthesizing the sulfonated epoxy resin polymer in a water miscible solvent and then diluting the reaction mixture with water. Suitable water miscible solvents are alcohols, amides, glycols, glycol ethers, such as isopropanol, butanol, 1,2-propylene glycol, ethylene glycol and hexylene glycol, N,N-dimethylformamide, N,N-dimethylacetamide, N-methylpyrrolidinone, ethylene glycol butyl ether, diethylene glycol methyl ether, dipropylene glycol methyl ether, di(propylene glycol) methyl ether, propylene glycol phenyl ether, propylene glycol methyl ether, mixtures thereof and the like.

In one embodiment, the sulfonated epoxy resin polymers of the present invention may be added to an aqueous salt solution commonly used to prevent clay swelling or migration. Any salt that can prevent clay swelling or migration can be used. Preferred clay stabilization salts are KCl, NaCl, NaBr and $NH_4Cl$. The concentration of the salt depends on the clay. Typical concentrations of KCl used in the field vary from about 1 to about 6 weight percent, preferably about 1 to about 2 weight percent. Typical concentrations of NaCl vary from about 10 weight percent to saturation. NaBr concentrations up to 11.4 pounds/gallon have been used. Typical concentrations of ammonium chloride vary from about 0.5 to about 2 weight percent.

The the sulfonated epoxy resin polymer is added to the aqueous salt solution used to prevent clay swelling or migration at a concentration from about 0.005 weight percent to about 2 weight percent, preferably 0.02 weight percent to about 0.2 weight percent.

Accordingly, in another preferred aspect, this invention is an aqueous composition comprising about 0.005 to about 2 weight percent sulfonated epoxy resin polymer and about 1 to about 10 weight percent of one or more clay stabilization salts.

In another preferred aspect, the clay stabilization salt is selected from KCl, NaCl, NaBr and $NH_4Cl$.

The aqueous compositions comprising the sulfonated epoxy resin polymer of this invention are applied to the formation by forcing, injecting or pumping composition directly into the formation to be treated so that the polymer contacts or treats the formation or the desired portion of the formation to alter the permeability of the formation as desired.

Particulate material (e.g., sand, silica flour and asbestos) can also be added to or suspended in the aqueous composition.

The treatment of a subterranean formation through an oil well can be accomplished using one or more liquid spacers, preflushes or afterflushes, such as a dilute salt solution and/or an aqueous alkali metal halide solution, into the formation to pretreat or clean the formation, then injecting the aqueous composition of this invention in an amount calculated to contact the desired portion of the formation with the sulfonated epoxy resin polymer.

In one embodiment of the method of the present invention, after the polymer preflush is injected and the fracturing treatment placed, the well is shut in for about 10 to 18 hours. In some cases this polymer preflush can be preceded by a solvent preflush that removes asphaltene and paraffin deposits in the formation.

The foregoing may be better understood by reference to the following examples, which are presented for purposes of illustration and are not intended to limit the scope of this invention.

EXAMPLES

In Examples 1 to 7 the following components are used:

"D.E.R.™ 332 Epoxy Resin" is a high purity bisphenol A diglycidyl ether having a titrated epoxide equivalent weight of 171.2 available from The Dow Chemical Company;

"Sulfanilic acid, sodium salt" is 97% pure and is available as the hydrate from Sigma-Aldrich Chemical;

"Anhydrous sodium hydroxide" is 98% pure and is available as anhydrous pellets from Sigma-Aldrich Chemical;

"N,N-DMF" is N,N-dimethylformamide which is 99.8% pure and is available anhydrous from Sigma-Aldrich Chemical;

"SURFONAMINE™ L-300 Terepolymer" is a hydrophilic polyether methyl initiated and primary monoamine terminated terepolymer prepared using propylene oxide and ethylene oxide in a ratio of 8:58 and having an amine equivalent weight of approximately 3000 daltons, available from Huntsman Corp.;

"Aminomethanesulfonic acid, sodium salt" is 97% pure and is available from Sigma-Aldrich Chemical; and "Tris(hydroxymethyl)aminomethane" is at least 99% pure and is available from Sigma-Aldrich Chemical.

Example 1

Sulfanilic acid, sodium salt is dried in a vacuum oven for 48 hours at 150° C. to remove water of hydration. A portion of dry sulfanilic acid, sodium salt (3.9034 grams, 0.02 mole, 0.04 amine hydrogen equivalent) and anhydrous N,N-DMF (170.0 grams) are added to a 500 milliliter, three neck, round bottom, glass reactor containing a magnetic stirring bar, under overhead dynamic nitrogen (1 liter per minute). The reactor is additionally outfitted with a condenser maintained at room temperature, a thermometer and an addition funnel containing D.E.R. 332 diglycidyl ether of bisphenol A (6.848 grams, 0.04 epoxide equivalent) dissolved in anhydrous N,N-DMF (40.48 grams). The reactants are weighed on a scale providing four decimal place accuracy. Dropwise addition of the D.E.R. 332 solution into the 23° C. stirred solution of sulfanilic acid, sodium salt commenced and is completed over 237 minutes. During this addition time, the reaction temperature is 22.5 to 23° C. The transparent, light yellow colored solution is maintained at 22 to 22.5° C. with stirring under the nitrogen atmosphere for 139.6 hours then removed from the reactor and rotary evaporated to give 11.14 grams of white powder. Further drying of the white powder at 150° C. for 24 hours in the vacuum oven removed residual N,N-DMF solvent giving 10.22 grams of white powder.

Mass balance, physical appearance (white powder), and behavior of the product (precipitates from the N,N-DMF reaction media with addition of small amounts of acetone, dry copolymer is substantially insoluble in solvents and water) indicated that the reaction forms a copolymer. Additionally, the copolymer swelled in the acetic acid/methylene chloride solvents which are used for epoxide titration, hence residual epoxide is not determined. The bisphenol A epoxy resin—sulfanilic acid, sodium salt copolymer is insoluble in water at room temperature and at 60° C. Addition of NaOH or concentrated HCl to a final concentration of 1% did not increase solubility.

Example 2

A portion of dry sulfanilic acid, sodium salt (3.5131 grams, 0.036 mole, 0.06 amine hydrogen equivalent), SURFONAMINE L-300 (5.9702 grams, 0.004 amine hydrogen equivalent) and anhydrous N,N-DMF (170.0 grams) are added to a 500 milliliter, three neck, round bottom, glass reactor outfitted as described in Example 1 above. D.E.R.™ 332 (6.848 grams, 0.04 epoxide equivalent) dissolved in anhydrous N,N-DMF (35.11 grams) is charged to the addition funnel.

Dropwise addition of the D.E.R. 332 solution into the 25° C. stirred solution of sulfanilic acid, sodium salt and SURFONAMINE L-300 commenced and is completed over 288 minutes. During this addition time, the reaction temperature is 25 to 26° C. The transparent, light yellow colored solution is maintained at 24.5 to 26° C. with stirring under the nitrogen atmosphere for 83.8 hours then removed from the reactor and rotary evaporated at 125° C. to a final vacuum of 0.25 mm Hg to give 16.20 grams of white powder.

The terepolymer of bisphenol A epoxy resin—sulfanilic (sodium salt)—SURFONAMINE L-300 dissolves after prolonged mixing in water acidified to 1% with concentrated HCl. A pH value of 2.2 is measured after the polymer completely dissolves in solution. Even though undissolved polymer is not observed, the solution has a bluish color, indicating aggregation in the micro or nanoscale. This polymer does not dissolve in DI water or in alkaline water. Dynamic light scattering is performed on the solution, the results of which are shown in FIG. 1. The data clearly shows aggregates on a scale of approximately 200 to 400 nm. Since this polymer did not dissolve in DI water or in alkaline water, at the acidic pH of 2.2 measured for the polymer solution, the tertiary nitrogen in the backbone of the polymer was protonated promoting interaction of the polymer with water causing nanoscale aggregates to be observed at acidic pH.

Example 3

Aminomethanesulfonic acid (22.22 grams, 0.20 mole) and anhydrous sodium hydroxide (8.0 grams, 0.20 mole) are added to DI water in a glass beaker and magnetically stirred to give a transparent solution. Minor amounts of aminomethanesulfonic acid are added to the stirred alkaline solution until a pH of 7 is achieved. The resultant neutral solution is vacuum filtered over diatomaceous earth packed as a bed in a 400 milliliter medium fritted glass funnel using a side arm vacuum flask. The filtrate is rotary evaporated using a maximum oil bath temperature of 100° C. to remove the bulk of the water, leaving behind a white powder. Further drying is completed in the vacuum oven at 125° C. for 18 hours to provide 23.38 grams of white powder product.

D.E.R. 332 (5.7067 grams, 0.033 epoxide equivalent) and anhydrous N,N-DMF (50 milliliters) are charged to a 500 milliliter, three neck, round bottom, glass reactor outfitted as described in Example 1 above with the exception that the addition funnel is replaced with a ground glass stopper. SURFONAMINE L-300 (4.9746 grams, 0.0033 amine hydrogen equivalent) solution in N,N-DMF (50 milliliters) is then added to the reactor followed by addition of dry aminomethanesulfonic acid, sodium salt (1.9964 grams, 0.015 mole, 0.03 amine hydrogen equivalent) and N,N-DMF (250 milliliters). Heating of the resultant 25° C. stirred mixture commenced after placing a heating mantle under the reactor and activating the temperature controller. After 7 minutes 35° C. is attained, and the stirred mixture is almost totally in solution with only slight haziness. The reaction is held overnight at 83° C. followed by heating to 100° C. the next day. At this time an increase in the haziness of the solution is noted. After 47.8 hours of reaction at 100° C., the hazy solution is removed from the reactor and rotary evaporated at 100° C. to a final vacuum of 0.27 mm Hg to give 12.65 grams of viscous, opaque liquid at room temperature.

The bisphenol A epoxy resin—aminomethanesulfonic (sodium salt)—SURFONAMINE L-300 terepolymer is insoluble in water at room temperature and at 60° C. Addition of NaOH or concentrated HCl to a final concentration of 1% did not increase solubility.

Example 4

Dry aminomethanesulfonic acid, sodium salt (3.993 grams, 0.03 mole, 0.06 amine hydrogen equivalent) and N,N-DMF (50 milliliters) are charged to a 500 milliliter, three neck, round bottom, glass reactor outfitted as described in Example 3 above. Diglycidyl ether of cis- and trans-1,3- and 1,4-cyclohexanedimethanol (7.7391 grams, 0.06 epoxide equivalent) and anhydrous N,N-DMF (300 milliliters) is then charged to the stirred mixture in the reactor. The diglycidyl ether of cis- and trans-1,3- and 1,4-cyclohexanedimethanol is distilled from the crude epoxy resin of cis- and trans-1,3- and 1,4-cyclohexanedimethanol. Epoxide equivalent weight of 128.985 is determined by titration and gas chromatographic analysis demonstrated a purity of 100 weight %. The hazy solution is stirred 44.6 hours at a temperature range of 23 to 23.5° C. Heating of the 23° C. hazy solution commenced after placing a heating mantle under the reactor and activating the temperature controller. After 40 minutes 75° C. is attained and the stirred reaction mixture is almost totally in solution with only slight haziness. The reaction is held for the next 20.6 hours at 75° C. then the slightly hazy solution is removed from the reactor and rotary evaporated at 125° C. to a final vacuum of 0.26 mm Hg giving 11.53 grams of opaque liquid (at 125° C.).

The diglycidyl ether of cis- and trans-1,3- and 1,4-cyclohexanedimethanol-aminomethanesulfonic acid, sodium salt copolymer is insoluble in water at room temperature and at 60° C. Addition of NaOH or concentrated HCl to a final concentration of 1% did not increase solubility. The copolymer precipitated in acetonitrile, formed an oil layer in water, and dissolved in acetonitrile when 25% weight water is added.

Example 5

Dry aminomethanesulfonic acid, sodium salt (1.3309 grams, 0.01 mole, 0.02 amine hydrogen equivalent), D.E.R. 332 (5.136 grams, 0.03 epoxide equivalent), trishydroxymethylaminomethane (0.6052 grams, 0.005 mole, 0.01 amine hydrogen equivalent) and N,N-DMF (350 milliliters) are charged to a 500 milliliter, three neck, round bottom, glass reactor outfitted as described in Example 3 above. Heating of the stirred mixture commences after placing a heating mantle under the reactor and activating the temperature controller. After 38 minutes 85° C. is attained and the stirred mixture is essentially unchanged. After an additional 41 minutes, 100° C. is achieved, and the mixture is almost totally in solution with only haziness. The reaction is held for the next 39 hours at 100° C. then the cloudy white mixture is removed from the reactor and rotary evaporated at 150° C. to a final vacuum of 0.26 mm Hg giving 7.00 grams of light yellow colored powder.

The bisphenol A epoxy resin—aminomethanesulfonic acid, sodium salt-tris(hydroxymethyl)aminomethane copolymer is insoluble in water at room temperature and at 60° C. Addition of NaOH or concentrated HCl to a final concentration of 1% did not increase solubility.

Example 6

A portion of dry aminomethanesulfonic acid, sodium salt (3.993 grams, 0.03 mole, 0.06 amine hydrogen equivalent) and anhydrous N,N-DMF (197.12 grams) are added to a 500 milliliter, 3 neck, round bottom, glass reactor outfitted as described in Example 1 above. The aminomethanesulfonic acid, sodium salt used is from Example 3. D.E.R. 332 (10.272 grams, 0.06 epoxide equivalent) dissolved in anhydrous N,N-DMF (23.30 grams) is charged to the addition funnel. The stirred mixture of aminomethanesulfonic acid, sodium salt in N,N-DMF is heated to 80° C. to solubilize most, but not all, of the aminomethanesulfonic acid, sodium salt that had solidified when cooled back to room temperature. Dropwise addition of the D.E.R. 332 solution into the 23.5° C. stirred hazy solution of aminomethanesulfonic acid, sodium salt commenced and is completed over 182 minutes. During this addition time, the reaction temperature is 23.5° C. The transparent, light yellow colored hazy solution is maintained at 23.5° C. with stirring under the nitrogen atmosphere for 99.6 hours then removed from the reactor and rotary evaporated. At 125° C. the product is a slightly yellow colored liquid. Further drying at 125° C. for 24 hours in the vacuum oven removed residual N,N-DMF solvent giving 13.48 grams of tacky white solid.

Mass balance, physical appearance (white powder) and behavior of the product indicated that the reaction formed a copolymer. Additionally, the copolymer is insoluble in the acetic acid/methylene chloride solvents which are used for epoxide titration, hence residual epoxide is not determined. The bisphenol A epoxy resin—aminomethanesulfonic acid (sodium salt) copolymer is insoluble in water at room temperature and at 60° C. Addition of NaOH or concentrated HCl to a final concentration of 1% did not increase solubility.

Example 7

An aqueous solution (10 grams) of 800 ppm bisphenol A epoxy resin—aminomethanesulfonic acid (sodium salt)—SURFONAMINE L-300 terepolymer from Example 3 in 2% KCl is placed in an oven at 50° C. for 20 minutes. The sample is then pumped through a 0.45 µl "Fisher" brand PTFE filter. The sample is able to go through the filter. An identical sample is placed into a 80° C. oven, also for 20 minutes, surpassing its cloud point of 76.4. None of the sample is able to go through the filter. After approximately 10-15 seconds, the sample is able to go through the filter. At this time, the sample had cooled to below the cloud point.

What is claimed is:

1. A method of modifying the permeability to water of a subterranean formation, the method comprising:
    injecting into the subterranean formation an aqueous composition including:
    from about 1 to about 10 weight percent of one or more clay stabilization salts; and
    from about 0.005 percent to about 2 percent, by weight, of a sulfonated epoxy composition comprising the reaction products of:
    (i) an epoxide-containing compound having an average of more than one epoxide group per molecule, the epoxide-containing compound being represented by the Formula I:

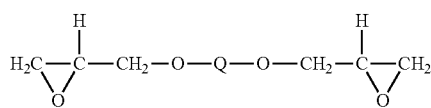

I where Q is selected from a divalent aromatic group —Ar—; Ar-L-Ar, wherein L is selected from a direct bond, $C_1$ to $C_8$ alkylene, —$SO_2$—, —S—, >C=O, or —O—; a divalent cycloaliphatic group K having from 4 carbons to 8 carbons, or —$R_1$—K—$R_2$— where $R_1$ and $R_2$ are independently a $C_1$ to $C_3$ alkylene group;

(ii) a primary amino sulfonate, the primary amino sulfonate being represented by the Formula II:

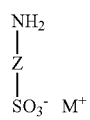

II wherein Z is an aliphatic, cycloaliphatic, polycycloaliphatic, or aromatic hydrocarbon group optionally substituted with one or more alkyl groups and M is Li+, Na+, K+, or $NH_4$+, and the molar ratio of (i) the epoxide-containing compound to (ii) the primary amino sulfonate being 5:1 to 1:5;

(iii) a primary monoamine alkylene oxide oligomer, the primary monoamine alkylene oxide oligomer being represented by the Formula III:

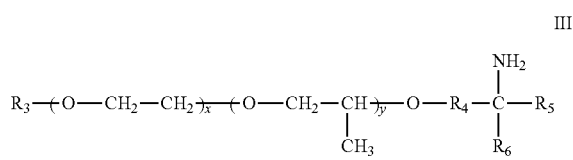

III wherein $R_3$ is —H, $C_1$ to $C_{12}$ alkyl or cycloalkyl, $R_4$ is a covalent bond, $C_1$ to $C_{12}$ alkyl or cycloalkyl, $R_5$ and $R_6$ are independently —H, $C_1$ to $C_{12}$ alkyl or cycloalkyl, and x and y independently have a value from 0 to 75 with the proviso that at least one of x or y is equal to or greater than 1; and (iv) optionally a primary monoamine, a secondary diamine, a monohydroxyalkyl primary monoamine, a dihydroxyalkyl primary monoamine, a trihydroxyalkyl primary monoamine, a mono hydroxycycloalkyl primary monoamine, a dihydroxycycloalkyl primary monoamine, or a trihydroxycycloalkyl primary monoamine.

2. The method of claim 1 wherein the reaction products have an average molecular weight of from 300 to 100,000.

3. The method of claim 1 wherein the primary monoamine alkylene oxide oligomer is present in an amount of from 1 to 15 percent, of the the amine hydrogen equivalents for reaction with the epoxide equivalents of component (i), the epoxide-containing compound.

4. The method of claim 1 wherein the epoxide-containing compound is selected from diglycidyl ether of 4,4'-isopropylidenediphenol (bisphenol A); cis-1,3-cyclohexanedimethanol; trans-1,3-cyclohexanedimethanol; cis-1,4-cyclohexanedimethanol; or trans-1,4-cyclohexanedimethanol.

5. The method of claim 1 wherein the primary amino sulfonate is selected from sulfanilic acid, sodium salt; sulfanilic acid, potassium salt; aminomethanesulfonic acid, sodium salt; or aminomethanesulfonic acid, potassium salt.

6. The method of claim 3 wherein for the primary monoamine alkylene oxide oligomer $R_3$ and $R_5$ are —$CH_3$, $R_4$ is —$CH_2$—, $R_6$ is —H, and x and y independently have a value from 0 to 75 with the proviso that at least one of x or y is equal to or greater than 1.

7. The method of claim 1 wherein the clay stabilization salts are selected from KCl, NaCl, NaBr, sodium acetate and $NH_4Cl$.

8. The method of claim 1 wherein the the sulfonated epoxy composition consists essentially of the reaction products of the epoxide-containing compound, the primary amino sulfonate, the primary monoamine alkylene oxide oligomer, and optionally the primary monoamine, the secondary diamine, the monohydroxyalkyl primary monoamine, the dihydroxyalkyl primary monoamine, the trihydroxyalkyl primary monoamine, the mono hydroxycycloalkyl primary monoamine, the dihydroxycycloalkyl primary monoamine, or the trihydroxycycloalkyl primary monoamine.

* * * * *